(12) United States Patent
Heap et al.

(10) Patent No.: US 8,868,252 B2
(45) Date of Patent: Oct. 21, 2014

(54) CONTROL ARCHITECTURE AND METHOD FOR TWO-DIMENSIONAL OPTIMIZATION OF INPUT SPEED AND INPUT POWER INCLUDING SEARCH WINDOWING

(75) Inventors: Anthony H. Heap, Ann Arbor, MI (US); Kee Yong Kim, Ann Arbor, MI (US); Bin Wu, Troy, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1583 days.

(21) Appl. No.: 12/239,904

(22) Filed: Sep. 29, 2008

(65) Prior Publication Data

US 2009/0118952 A1 May 7, 2009

Related U.S. Application Data

(60) Provisional application No. 60/985,227, filed on Nov. 3, 2007.

(51) Int. Cl.
| | | |
|---|---|---|
| G05D 1/00 | (2006.01) | |
| G05D 3/00 | (2006.01) | |
| G06F 7/00 | (2006.01) | |
| G06F 17/00 | (2006.01) | |
| B60W 30/188 | (2012.01) | |
| B60W 10/06 | (2006.01) | |
| B60K 6/445 | (2007.10) | |
| B60W 10/02 | (2006.01) | |
| B60W 10/184 | (2012.01) | |
| B60W 10/08 | (2006.01) | |
| G06F 19/00 | (2011.01) | |
| H02P 17/00 | (2006.01) | |
| B60W 10/04 | (2006.01) | |
| B60W 10/10 | (2012.01) | |
| B60W 20/00 | (2006.01) | |

(52) U.S. Cl.
CPC ......... *B60W 10/184* (2013.01); *B60W 30/1882* (2013.01); *B60W 10/06* (2013.01); *Y02T 10/6286* (2013.01); *B60W 2540/10* (2013.01); *B60L 2240/486* (2013.01); *Y02T 10/56* (2013.01); *B60W 20/00* (2013.01); *B60K 6/445* (2013.01); *B60W 10/02* (2013.01); *B60W 10/08* (2013.01); *Y02T 10/6239* (2013.01); *B60W 2710/105* (2013.01)
USPC ........ 701/1; 701/51; 701/52; 701/53; 701/56; 701/84; 477/15; 477/17; 477/34; 477/37

(58) Field of Classification Search
USPC ............ 701/1, 51–53, 56, 84; 477/15, 17, 34, 477/37
See application file for complete search history.

(56) References Cited

U.S. PATENT DOCUMENTS

| | | | | |
|---|---|---|---|---|
| 5,274,559 | A | * | 12/1993 | Takahashi et al. ............ 701/103 |
| 6,110,066 | A | * | 8/2000 | Nedungadi et al. ............... 475/5 |
| 6,832,148 | B1 | | 12/2004 | Bennett |
| 6,868,318 | B1 | | 3/2005 | Cawthorne |

(Continued)

*Primary Examiner* — Helal A Algahaim
*Assistant Examiner* — Kelly E Darby

(57) ABSTRACT

A microprocessor driven two dimensional search engine examines transmission operating points within a plurality of search range spaces and assists in determining properties associated with the driveline at various operating points within the space. The size of the space is reduced by rearrangement of data.

7 Claims, 11 Drawing Sheets

(56) References Cited

U.S. PATENT DOCUMENTS

| | | | |
|---|---|---|---|
| 6,957,137 B2 * | 10/2005 | Hubbard et al. | 701/54 |
| 7,024,299 B2 * | 4/2006 | Hubbard et al. | 701/54 |
| 7,154,236 B1 | 12/2006 | Heap | |
| 2003/0217876 A1 * | 11/2003 | Severinsky et al. | 180/65.2 |
| 2004/0148096 A1 * | 7/2004 | Katou | 701/201 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1 | 11/2005 | Hubbard | |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2006/0194670 A1 | 8/2006 | Heap | |
| 2006/0213704 A1 * | 9/2006 | Mack | 180/65.2 |
| 2007/0078580 A1 | 4/2007 | Cawthorne | |
| 2007/0093953 A1 | 4/2007 | Heap | |
| 2007/0149348 A1 | 6/2007 | Holmes | |
| 2007/0191181 A1 | 8/2007 | Burns | |
| 2007/0202987 A1 | 8/2007 | Kakinami et al. | |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Aettel | |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0176706 A1 | 7/2008 | Wu | |
| 2008/0176709 A1 | 7/2008 | Wu | |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1 | 4/2009 | West | |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0108673 A1 | 4/2009 | Wang | |
| 2009/0111637 A1 | 4/2009 | Day | |
| 2009/0111640 A1 | 4/2009 | Buur | |
| 2009/0111642 A1 | 4/2009 | Sah | |
| 2009/0111643 A1 | 4/2009 | Sah | |
| 2009/0111644 A1 | 4/2009 | Kaminsky | |
| 2009/0111645 A1 | 4/2009 | Heap | |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1 | 4/2009 | Heap | |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112421 A1 | 4/2009 | Sah | |
| 2009/0112422 A1 | 4/2009 | Sah | |
| 2009/0112423 A1 | 4/2009 | Foster | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |
| 2009/0115354 A1 | 5/2009 | Heap | |
| 2009/0115365 A1 | 5/2009 | Heap | |
| 2009/0115373 A1 | 5/2009 | Kokotovich | |
| 2009/0115377 A1 | 5/2009 | Schwenke | |
| 2009/0115408 A1 | 5/2009 | West | |
| 2009/0115491 A1 | 5/2009 | Anwar | |
| 2009/0118074 A1 | 5/2009 | Zettel | |
| 2009/0118075 A1 | 5/2009 | Heap | |
| 2009/0118076 A1 | 5/2009 | Heap | |
| 2009/0118077 A1 | 5/2009 | Hsieh | |
| 2009/0118078 A1 | 5/2009 | Wilmanowicz | |
| 2009/0118079 A1 | 5/2009 | Heap | |
| 2009/0118080 A1 | 5/2009 | Heap | |
| 2009/0118081 A1 | 5/2009 | Heap | |
| 2009/0118082 A1 | 5/2009 | Heap | |
| 2009/0118083 A1 | 5/2009 | Kaminsky | |
| 2009/0118084 A1 | 5/2009 | Heap | |
| 2009/0118085 A1 | 5/2009 | Heap | |
| 2009/0118086 A1 | 5/2009 | Heap | |
| 2009/0118087 A1 | 5/2009 | Hsieh | |
| 2009/0118089 A1 | 5/2009 | Heap | |
| 2009/0118090 A1 | 5/2009 | Heap | |
| 2009/0118091 A1 | 5/2009 | Lahti | |
| 2009/0118093 A1 | 5/2009 | Heap | |
| 2009/0118094 A1 | 5/2009 | Hsieh | |
| 2009/0118877 A1 | 5/2009 | Center | |
| 2009/0118879 A1 | 5/2009 | Heap | |

(56) References Cited

U.S. PATENT DOCUMENTS

| | | |
|---|---|---|
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1* | 5/2009 | Heap et al. ................ 701/54 |
| 2009/0118921 A1 | 5/2009 | Heap |
| 2009/0118922 A1* | 5/2009 | Heap et al. ................ 701/54 |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1* | 5/2009 | Heap et al. ................ 701/54 |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |
| 2010/0295810 A1* | 11/2010 | Nagata et al. ............. 345/173 |

* cited by examiner

US 8,868,252 B2

CONTROL ARCHITECTURE AND METHOD FOR TWO-DIMENSIONAL OPTIMIZATION OF INPUT SPEED AND INPUT POWER INCLUDING SEARCH WINDOWING

CROSS-REFERENCES TO RELATED APPLICATIONS

This application claims the benefit of U.S. Provisional Application No. 60/985,227 filed on Nov. 3, 2007, which is hereby incorporated herein by reference.

TECHNICAL FIELD

This disclosure relates generally to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A method for decreasing the size of a space from within which a two-dimensional search engine selects points defined by numerical pairs for evaluation, the space including at least one two-dimensional first region, the first region having minimum and maximum abscissa and ordinate values associated with it, includes generating a plurality of contour plots, the contour plots having abscissa and ordinate axes, and including contours which are representative of a property associated with points within the first region bounded by the abscissa and ordinate axes, selecting a second region from each of the contour plots, the second regions each comprising minimum and maximum abscissa values and minimum and maximum ordinate values, providing four tables of data, the data in each table of the four tables including one of four variables selected from the group consisting of: the minimum abscissa value, the maximum abscissa value, the minimum ordinate value, and the maximum ordinate value, providing a two-dimensional input request, extracting a value for each of the minimum abscissa value, the maximum abscissa value, the minimum ordinate value, and the maximum ordinate value from the tables, to provide extracted values based upon the input request, and defining a search space based on the extracted values.

BRIEF DESCRIPTION OF THE DRAWINGS

One or more embodiments will now be described, by way of example, with reference to the accompanying drawings, in which.

DETAILED DESCRIPTION

Figure 1:
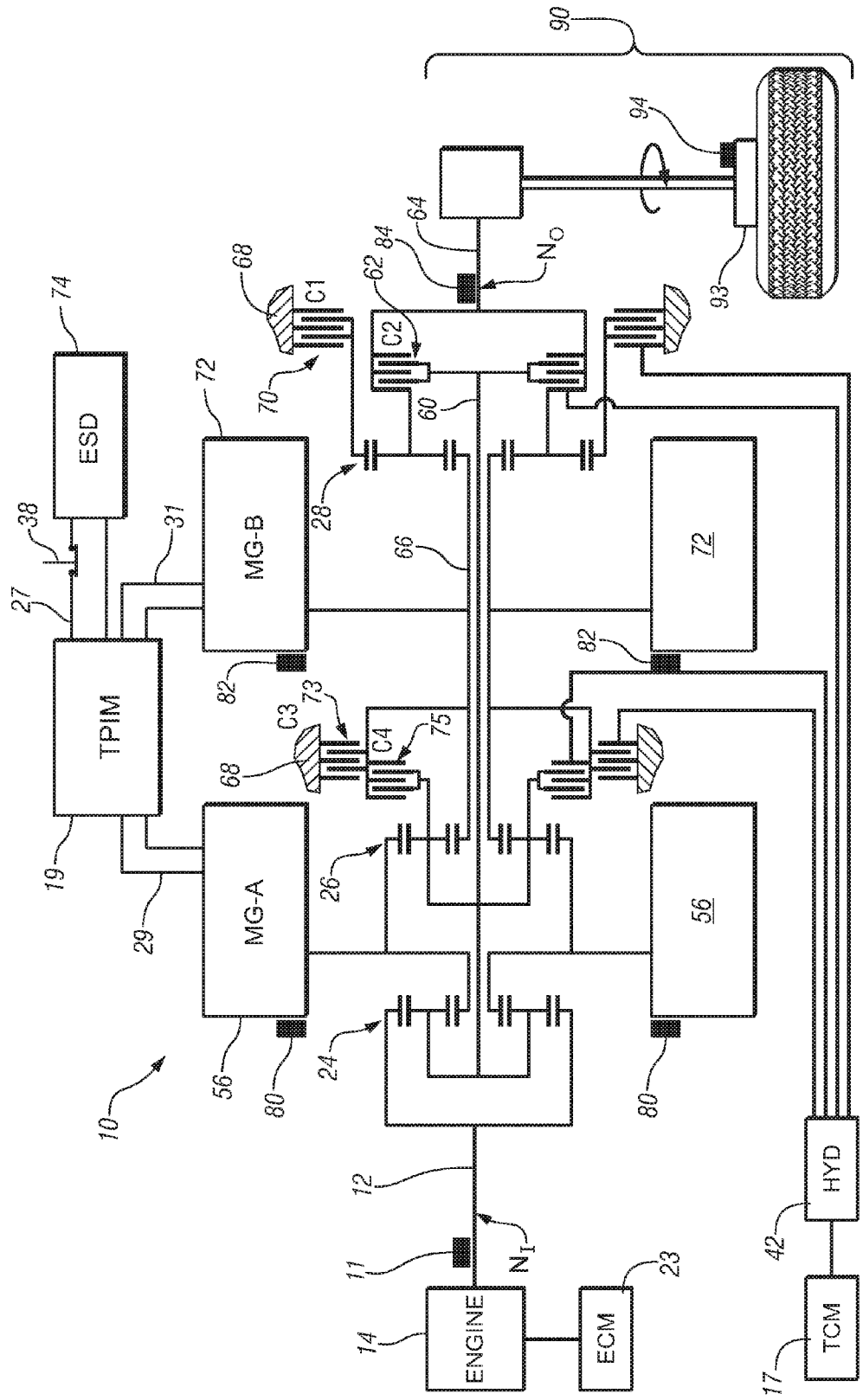
FIG. 1 is a schematic diagram of an exemplary powertrain, in accordance with the present disclosure.

Referring now to the drawings, wherein the showings are for the purpose of illustrating certain exemplary embodiments only and not for the purpose of limiting the same, FIG. 1 shows an exemplary electro-mechanical hybrid powertrain. The exemplary electro-mechanical hybrid powertrain shown in FIG. 1 comprises a two-mode, compound-split, electro-mechanical hybrid transmission 10 operatively connected to an engine 14, and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

In one embodiment, the exemplary engine 14 comprises a multi-cylinder internal combustion engine which is selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 is preferably present to monitor rotational speed of the input shaft 12. Power output from the engine 14, comprising rotational speed and output torque, can differ from the input speed, $N_I$, and the input torque, $T_I$, to the transmission 10 due to torque-consuming components being present on or in operative mechanical contact with the input shaft 12 between the engine 14 and the transmission 10, e.g., a hydraulic pump (not shown) and/or a torque management device (not shown).

In one embodiment the exemplary transmission 10 comprises three planetary-gear sets 24, 26 and 28, and four selectively-engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. In one embodiment, clutches C2 62 and C4 75 preferably comprise hydraulically-applied rotating friction clutches. In one embodiment, clutches C1 70 and C3 73 preferably comprise hydraulically-controlled stationary devices that can be selectively grounded to a transmission case 68. In a preferred embodiment, each of the clutches C1 70, C2 62, C3 73, and C4 75 is preferably hydraulically applied, selectively receiving pressurized hydraulic fluid via the hydraulic control circuit 42.

In one embodiment, the first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with commands provided to the TPIM which derive from such factors as including operator torque requests, current operating conditions and states, and such commands determine whether the ESD 74 is being charged, discharged or is in stasis at any given instant.

The TPIM 19 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31, depending on commands received which are typically based on factors which include current operating state and operator torque demand.

Figure 2:
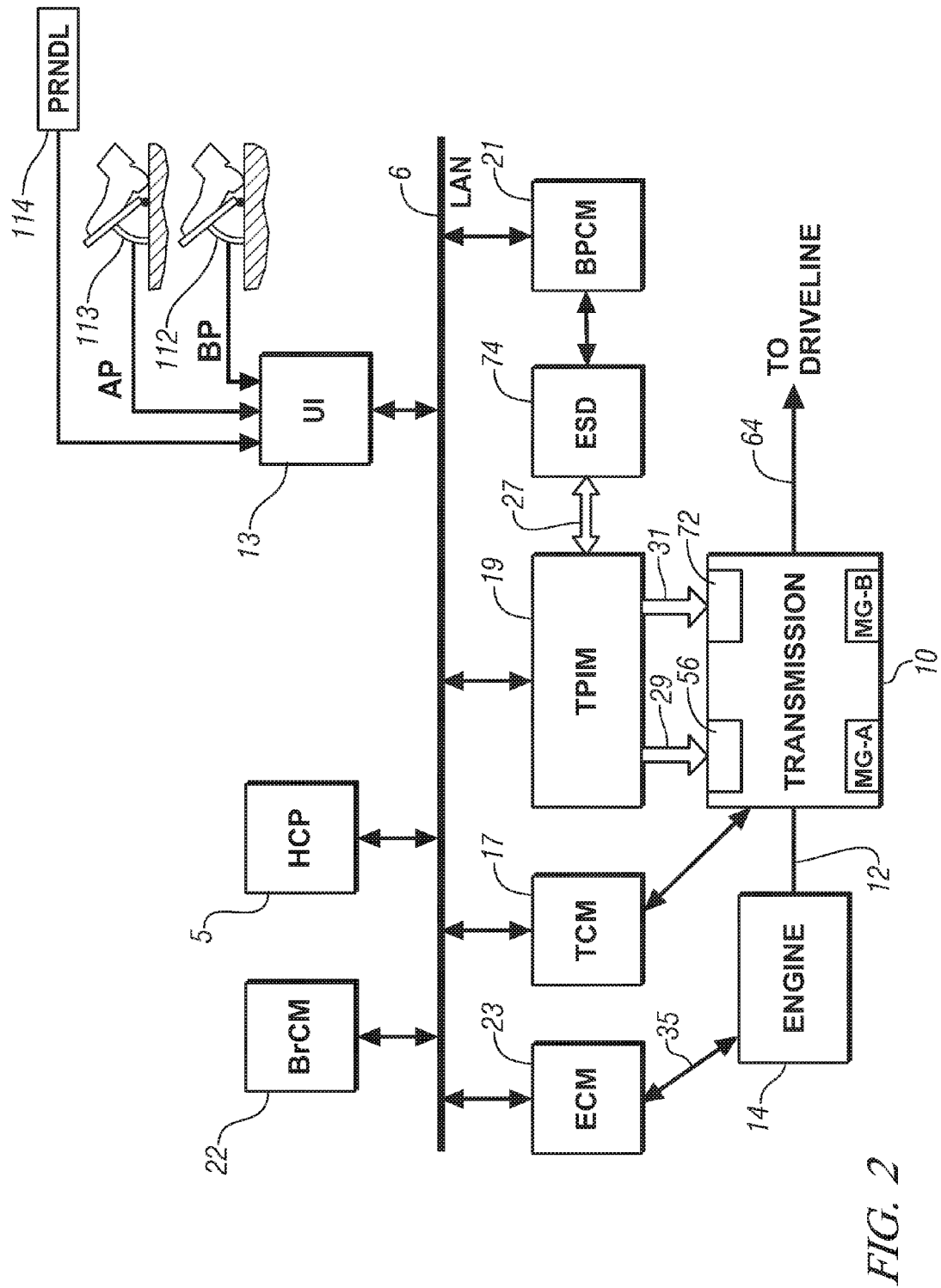
FIG. 2 is a schematic diagram of an exemplary architecture for a control system and powertrain, in accordance with the present disclosure.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator may selectively control or direct operation of the electro-mechanical hybrid powertrain. The devices present in UI 13 typically include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters which may include without limitation: a manifold pressure, engine coolant temperature, throttle position, ambient air temperature, and ambient pressure. The engine load can be determined, for example, from the manifold pressure, or alternatively, from monitoring operator input to the accelerator pedal 113. The ECM 23 generates and communicates command signals to control engine actuators, which may include without limitation actuators such as: fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are preferably executed at regular intervals, for example at each 3.125, 6.25, 12.5, 25 and 100 milliseconds during ongoing operation of the powertrain. However, any interval between about 2 milliseconds and about 300 milliseconds may be selected. Alternatively, algorithms may be executed in response to the occurrence of any selected event.

The exemplary powertrain shown in reference to FIG. 1 is capable of selectively operating in any of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. As an example, a first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. For example, a first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and the first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, the input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The engine state and the transmission operating range state are determined based upon operating characteristics of the hybrid powertrain. This includes the operator torque request communicated through the accelerator pedal 113 and brake pedal 112 to the user interface 13 as previously described. The transmission operating range state and the engine state may be predicated on a hybrid powertrain torque demand caused by a command to operate the first and second electric machines 56 and 72 in an electrical energy generating mode or in a torque generating mode. The transmission operating range state and the engine state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 at output member 64 that is required to meet the operator torque request while meeting other powertrain operating demands, e.g., charging the ESD 74. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
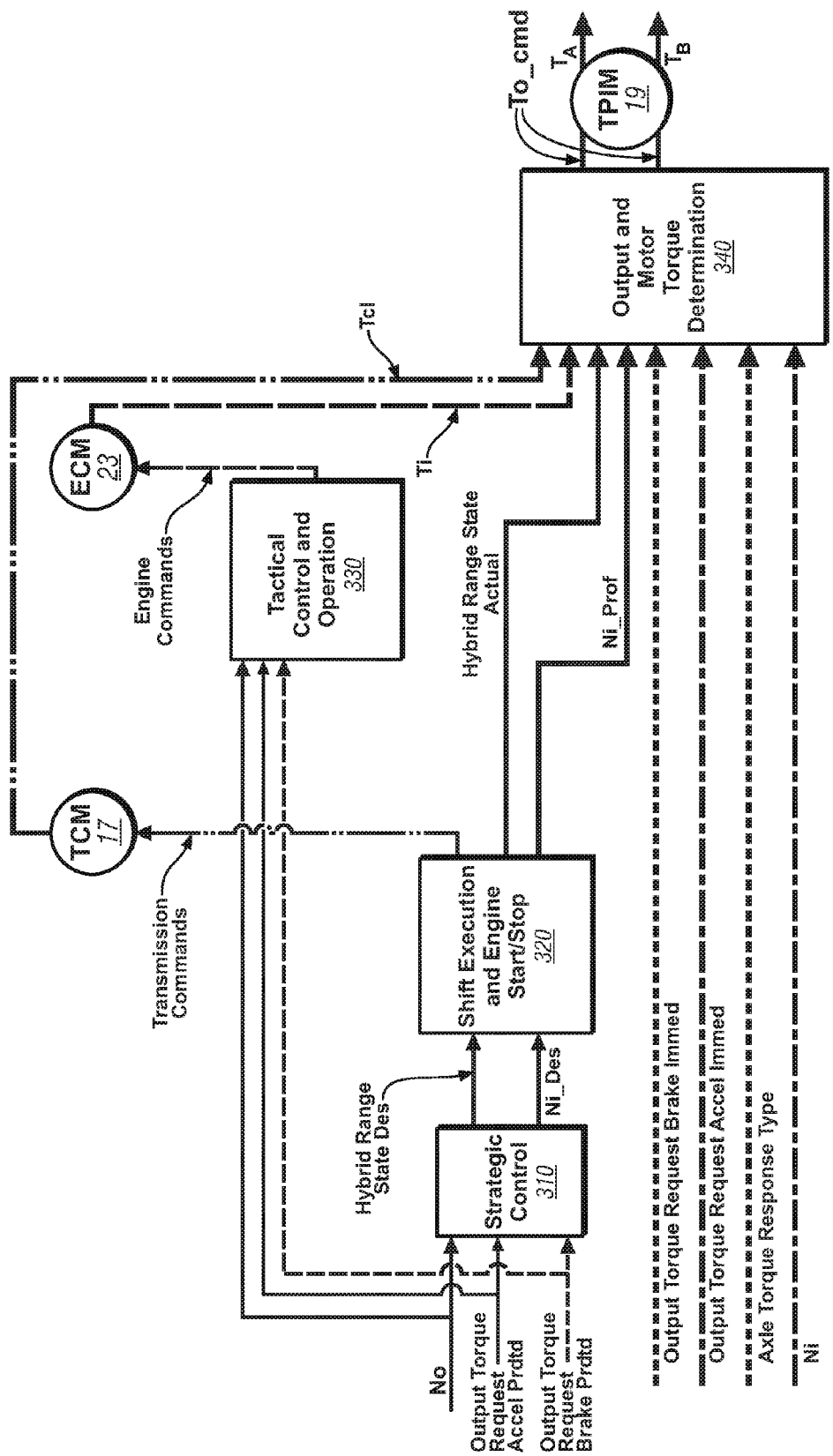
FIGS. 3-8 are schematic flow diagrams of various aspects of a control scheme, in accordance with the present disclosure.

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines. Alternatively, the hybrid powertrain system can utilize non-electric torque-generative machines and energy storage systems, e.g., hydraulic-mechanical hybrid transmissions (not shown).

In operation, the operator inputs to the accelerator pedal 113 and the brake pedal 112 are monitored to determine the operator torque request. The operator inputs to the accelerator pedal 113 and the brake pedal 112 comprise individually determinable operator torque request inputs including an immediate accelerator output torque request ('Output Torque Request Accel Immed'), a predicted accelerator output torque request ('Output Torque Request Accel Prdtd'), an immediate brake output torque request ('Output Torque Request Brake Immed'), a predicted brake output torque request ('Output Torque Request Brake Prdtd') and an axle torque response type ('Axle Torque Response Type'). As used herein, the term 'accelerator' refers to an operator request for forward propulsion preferably resulting in increasing vehicle speed over the present vehicle speed, when the operator selected position of the transmission gear selector 114 commands operation of the vehicle in the forward direction. The terms 'deceleration' and 'brake' refer to an operator request preferably resulting in decreasing vehicle speed from the present vehicle speed. The immediate accelerator output torque request, the predicted accelerator output torque request, the immediate brake output torque request, the predicted brake output torque request, and the axle torque response type are individual inputs to the control system. Additionally, operation of the engine 14 and the transmission 10 are monitored to determine the input speed ('Ni') and the output speed ('No'). The immediate accelerator output torque request is determined based upon a presently occurring operator input to the accelerator pedal 113, and comprises a request to generate an immediate output torque at the output member 64 preferably to accelerate the vehicle. The predicted accelerator output torque request is determined based upon the operator input to the accelerator pedal 113 and comprises an optimum or preferred output torque at the output member 64. The predicted accelerator output torque request is preferably equal to the immediate accelerator output torque request during normal operating conditions, e.g., when any one of antilock braking, traction control, or vehicle stability is not being commanded. When any one of antilock braking, traction control or vehicle stability is being commanded the predicted accelerator output torque request remains the preferred output torque with the immediate accelerator output torque request being decreased in response to output torque commands related to the antilock braking, traction control, or vehicle stability control.

The immediate brake output torque request is determined based upon a presently occurring operator input to the brake pedal 112, and comprises a request to generate an immediate output torque at the output member 64 to effect a reactive torque with the driveline 90 which preferably decelerates the vehicle. The predicted brake output torque request comprises an optimum or preferred brake output torque at the output member 64 in response to an operator input to the brake pedal 112 subject to a maximum brake output torque generated at the output member 64 allowable regardless of the operator input to the brake pedal 112. In one embodiment the maximum brake output torque generated at the output member 64 is limited to −0.2 g. The predicted brake output torque request can be phased out to zero when vehicle speed approaches zero regardless of the operator input to the brake pedal 112. When commanded by the operator, there can be operating conditions under which the predicted brake output torque request is set to zero, e.g., when the operator setting to the transmission gear selector 114 is set to a reverse gear, and when a transfer case (not shown) is set to a four-wheel drive low range.

A strategic control scheme ('Strategic Control') 310 determines a preferred input speed ('Ni_Des') and a preferred engine state and transmission operating range state ('Hybrid Range State Des') based upon the output speed and the operator torque request and based upon other operating parameters of the hybrid powertrain, including battery power limits and response limits of the engine 14, the transmission 10, and the first and second electric machines 56 and 72. The predicted accelerator output torque request and the predicted brake output torque request are input to the strategic control scheme 310. The strategic control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is executed during one of the control loop cycles to determine engine commands ('Engine Commands') for operating the engine 14, including a preferred input torque from the engine 14 to the transmission 10 based upon the output speed, the input speed, and the operator torque request comprising the immediate accelerator output torque request, the predicted accelerator output torque request, the immediate brake output torque request, the predicted brake output torque request, the axle torque response type, and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state. An engine command comprising the preferred input torque of the engine 14 and the present input torque ('Ti') reacting between the engine 14 and the input member 12 are preferably determined in the ECM 23. Clutch torques ('Tcl') for each of the clutches C1 70, C2 62, C3 73, and C4 75, including the presently applied clutches and the non-applied clutches are estimated, preferably in the TCM 17.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

Figure 4:
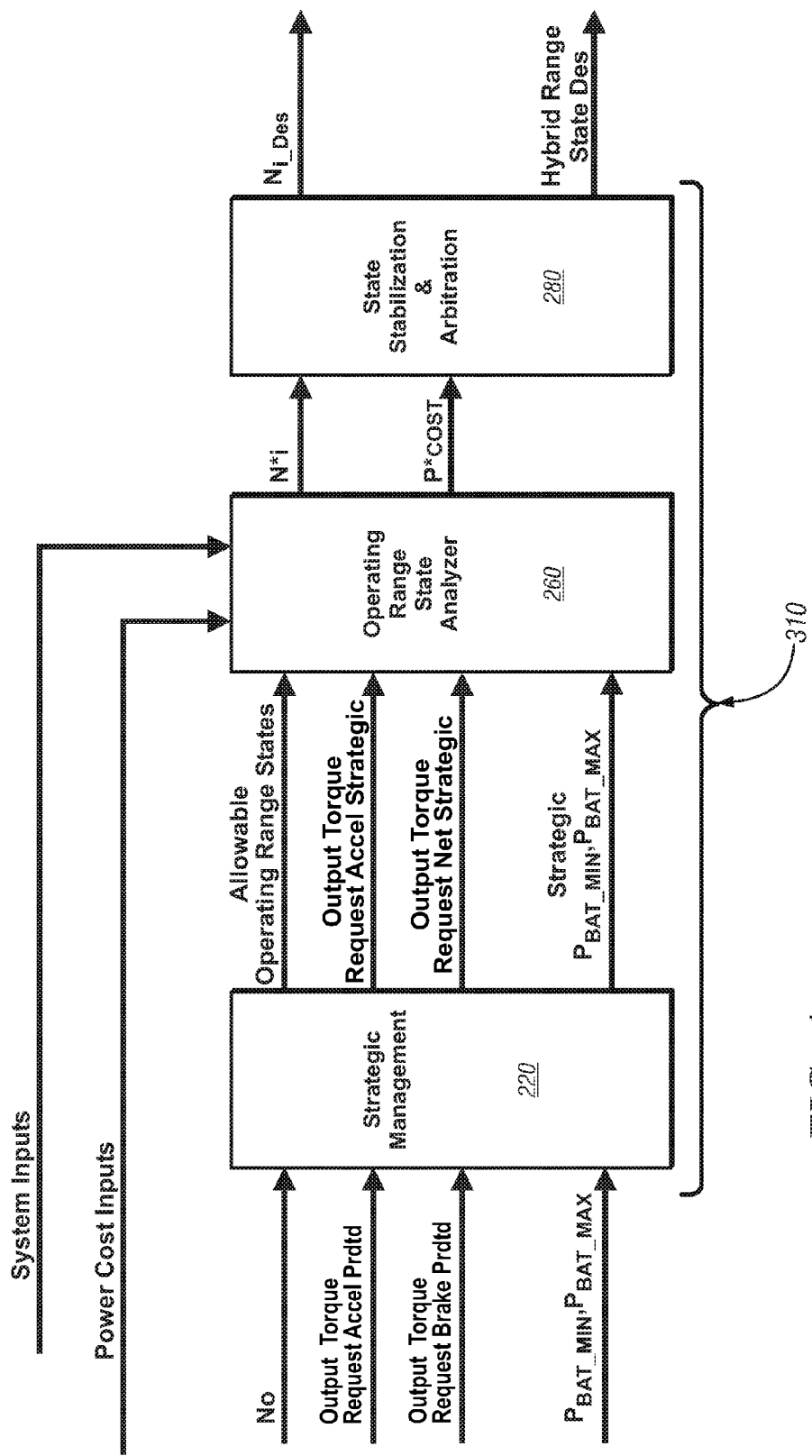

FIG. 4 details signal flow in the strategic optimization control scheme 310, which includes a strategic manager 220, an operating range state analyzer 260, and a state stabilization and arbitration block 280 to determine the preferred input speed ('Ni_Des') and the preferred transmission operating range state ('Hybrid Range State Des'). The strategic manager ('Strategic Manager') 220 monitors the output speed $N_O$, the predicted accelerator output torque request ('Output Torque Request Accel Prdtd'), the predicted brake output torque request ('Output Torque Request Brake Prdtd'), and available battery power $P_{BAT\_MIN}$ to $P_{BAT\_MAX}$. The strategic manager 220 determines which of the transmission operating range states are allowable, and determines output torque requests comprising a strategic accelerator output torque request ('Output Torque Request Accel Strategic') and a strategic net output torque request ('Output Torque Request Net Strategic'), all of which are input the operating range state analyzer 260 along with system inputs ('System Inputs'), power cost inputs ('Power Cost Inputs'), and any associated penalty costs ('Penalty Costs') for operating outside of predetermined limits. The operating range state analyzer 260 generates a preferred power cost ('P*cost') and associated input speed ('N*i') for each of the allowable operating range states based upon the operator torque requests, the system inputs, the available battery power and the power cost inputs. The preferred power costs and associated input speeds for the allowable operating range states are input to the state stabilization and arbitration block 280 which selects the preferred operating range state and preferred input speed based thereon.

Figure 5:
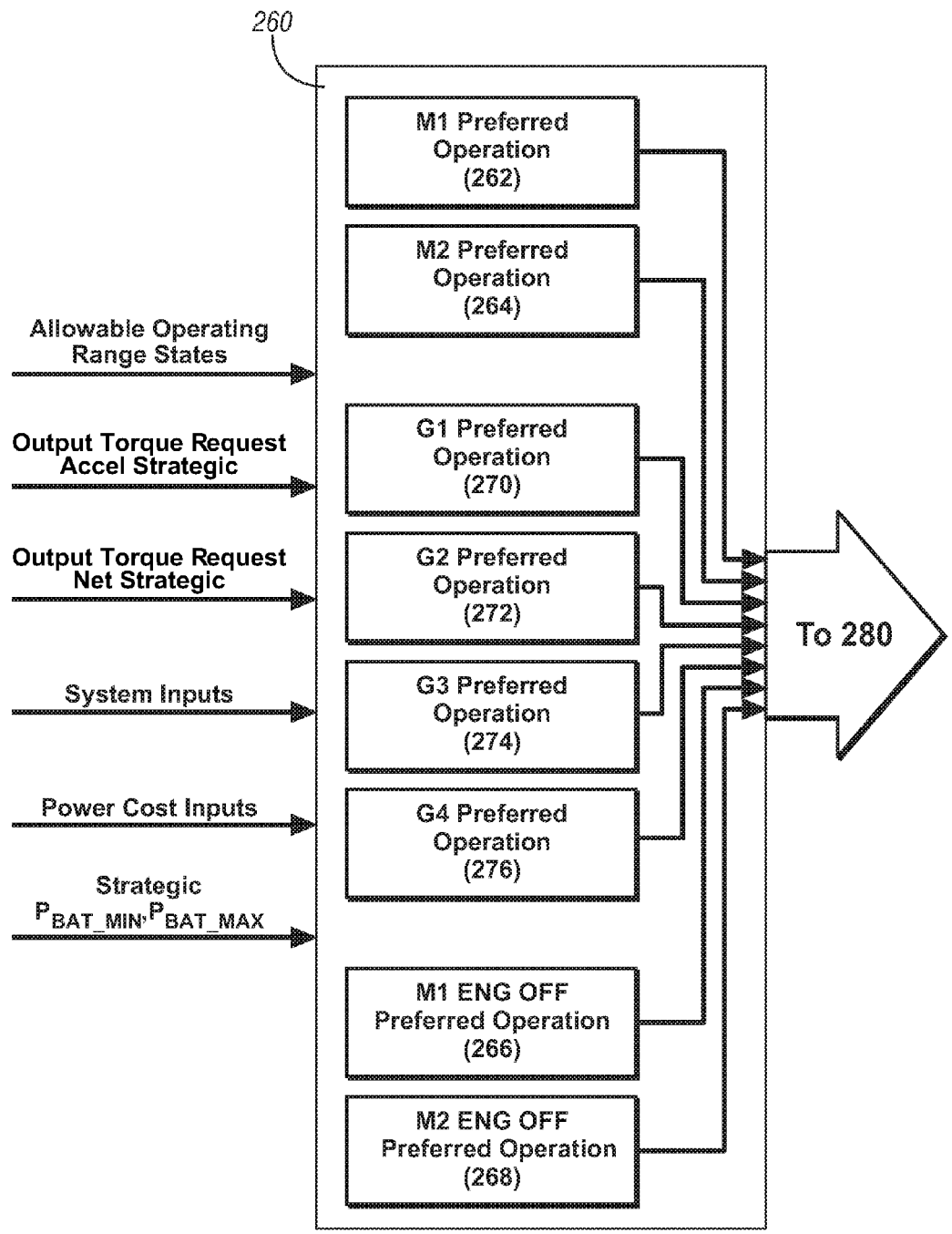

FIG. 5 shows the operating range state analyzer 260 that executes searches in each candidate operating range state comprising the allowable ones of the operating range states, including M1 (262), M2 (264), G1 (270), G2 (272), G3 (274), and G4 (276) to determine preferred operation of the torque actuators, i.e., the engine 14 and the first and second electric machines 56 and 72 in this embodiment. The preferred operation preferably comprises a minimum power cost for operating the hybrid powertrain system and an associated engine input for operating in the candidate operating range state in response to the operator torque request. The associated engine input comprises at least one of a preferred engine input speed ('Ni*'), a preferred engine input power ('Pi*'), and a preferred engine input torque ('Ti*') that is responsive to and preferably meets the operator torque request. The operating range state analyzer 260 evaluates powertrain operation in M1-Engine Off (264) and M2-Engine Off (266) states to determine a preferred cost ('P*cost') for operating the powertrain system responsive to and preferably meeting the operator torque request when the engine 14 is in the engine-off state.

Figure 6:
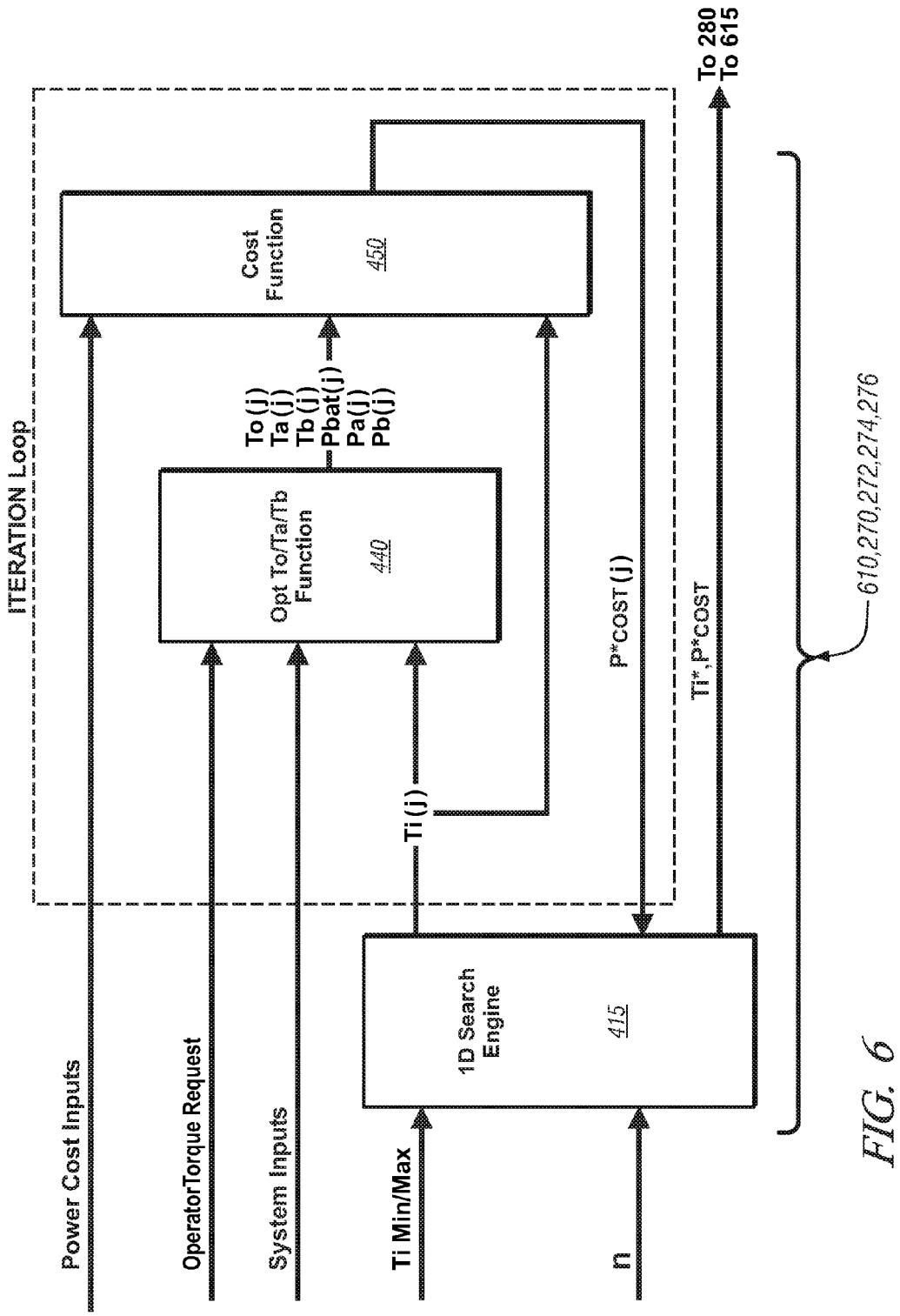

FIG. 6 schematically shows signal flow for a 1-dimension search scheme 610, executed in each of G1 (270), G2 (272), G3 (274), and G4 (276). A range of one controllable input, in this embodiment comprising minimum and maximum input torques ('TiMin/Max'), is input to a 1-D search engine 415. The 1-D search engine 415 iteratively generates candidate input torques ('Ti(j)') which range between the minimum and maximum input torques, each which is input to an optimization function ('Opt To/Ta/Tb') 440, for n search iterations. Other inputs to the optimization function 440 include system inputs preferably comprise parametric states for battery power, clutch torques, electric motor operation, transmission and engine operation, the specific operating range state and the operator torque request. The optimization function 440 determines transmission operation comprising an output torque, motor torques, and associated battery and electrical powers ('To(j), Ta(j), Tb(j), Pbat(j), Pa(j), Pb(j)') associated with the candidate input torque based upon the system inputs in response to the operator torque request for the candidate operating range state. The output torque, motor torques, and associated battery powers, penalty costs, and power cost inputs are input to a cost function 450, which executes to determine a power cost ('Pcost(j)') for operating the powertrain in the candidate operating range state at the candidate input torque in response to the operator torque request. The 1-D search engine 415 iteratively generates candidate input torques over the range of input torques. The optimization function 440 determines the transmission operation for each candidate input torque. The cost function 450 determines the associated power costs. The 1-D search engine 415 identifies a preferred input torque ('Ti*') and associated preferred cost ('P*cost'). The preferred input torque ('Ti*') comprises the candidate input torque within the range of input torques that results in a minimum power cost of the candidate operating range state, i.e., the preferred cost.

Figure 7:
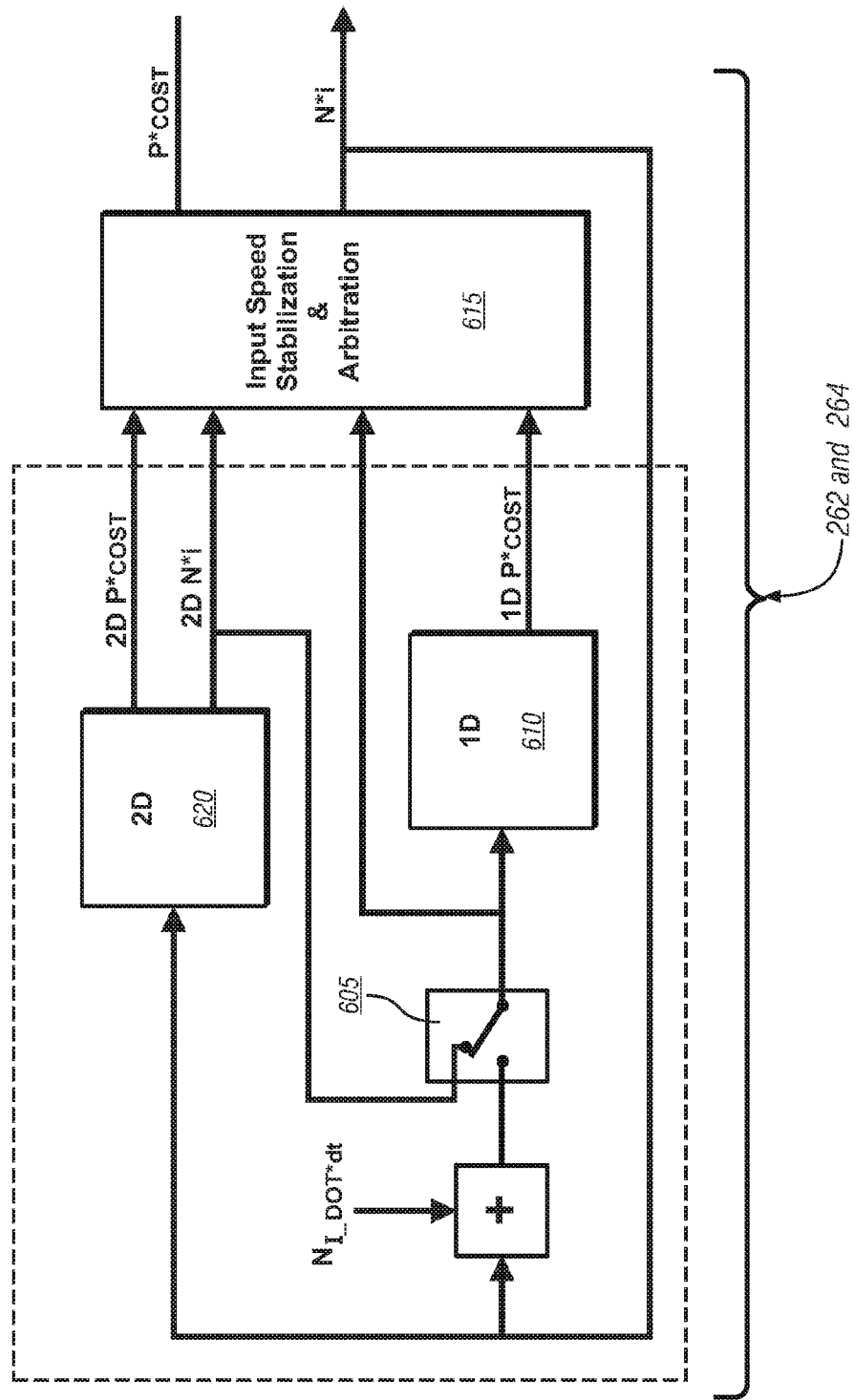
Figure 8:
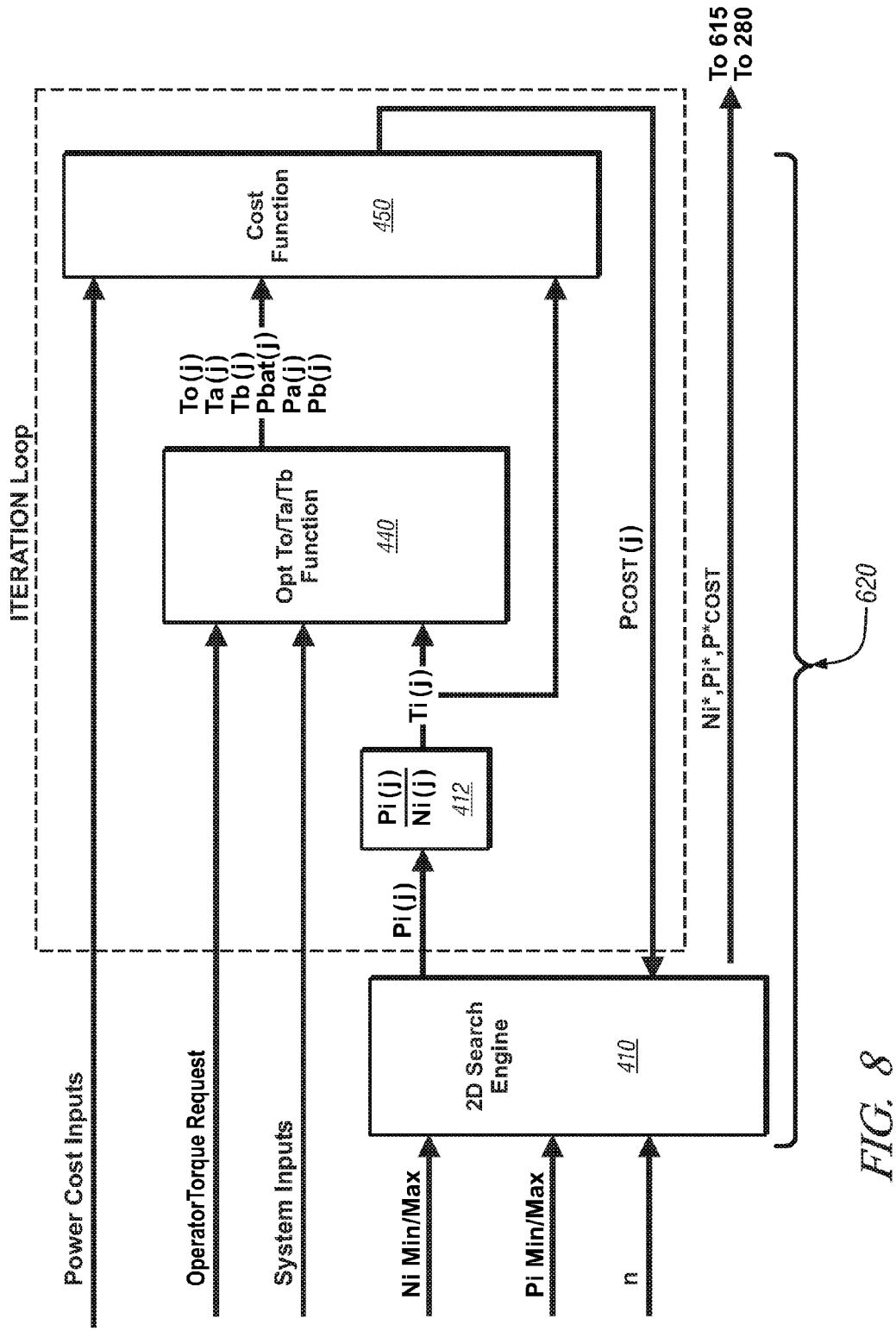

The preferred operation in each of M1 and M2 can be determined by executing a 2-dimensional search scheme 620, shown with reference to FIGS. 7 and 8, in conjunction with executing a 1-dimensional search using the 1-dimensional search scheme 610 based upon a previously determined input speed which can be arbitrated ('Input Speed Stabilization and Arbitration') 615 to determine preferred input speeds ('N*i') and associated preferred costs ('P*cost') for the operating range states.

FIG. 7 shows the preferred operation in each of continuously variable modes M1 and M2 executed in blocks 262 and 264 of the operating range state analyzer 260. This includes executing a 2-dimensional search scheme 620, shown with reference to FIGS. 6 and 8, in conjunction with executing a 1-dimensional search using the 1-dimensional search scheme 610 based upon a previously determined input speed which can be arbitrated ('Input Speed Stabilization and Arbitration') 615 to determine preferred costs ('P*cost') and associated preferred input speeds ('N*i') for the operating range states. As described with reference to FIG. 8, the 2-dimensional search scheme 620 determines a first preferred cost ('2D P*cost') and an associated first preferred input speed ('2D N*T'). The first preferred input speed is input to the 2-dimensional search scheme 620 and to an adder 612. The adder 612 sums the first preferred input speed and a time-rate change in the input speed ('$N_{I\_DOT}$') multiplied by a predetermined time period ('dt'). The resultant is input to a switch 605 along with the first preferred input speed determined by the 2-dimensional search scheme 620. The switch 605 is controlled to input either the resultant from the adder 612 or the preferred input speed determined by the 2-dimensional search scheme 620 into the 1-dimensional search scheme 610. The switch 605 is controlled to input the preferred input speed determined by the 2-dimensional search scheme 620 into the 1-dimensional search scheme 610 (as shown) when the powertrain system is operating in a regenerative braking mode, e.g., when the operator torque request includes a request to generate an immediate output torque at the output member 64 to effect a reactive torque with the driveline 90 which preferably decelerates the vehicle. The switch 605 is controlled to a second position (not shown) to input the resultant from the adder 612 when the operator torque request does not include regenerative braking. The 1-dimensional search scheme 610 is executed to determine a second preferred cost ('1D P*cost') using the 1-dimensional search scheme 610, which is input to the input speed stabilization and arbitration block 615 to select a final preferred cost and associated preferred input speed.

FIG. 8 schematically shows signal flow for the 2-dimension search scheme 620. Ranges of two controllable inputs, in this embodiment comprising minimum and maximum input speeds ('Ni Min/Max') and minimum and maximum input powers ('Pi Min/Max') are input to a 2-D search engine 410. In another embodiment, the two controllable inputs can comprise minimum and maximum input speeds and minimum and maximum input torques. The 2-D search engine 410 iteratively generates candidate input speeds ('Ni(j)') and candidate input powers ('Pi(j)') which range between the minimum and maximum input speeds and powers. The candidate input power is preferably converted to a candidate input torque ('Ti(j)') (412). Each candidate input speed ('Ni(j)') and candidate input torque ('Ti(j)') are input to the optimization function ('Opt To/Ta/Tb') 440, for n search iterations. Other inputs to the optimization function 440 include system inputs preferably comprising parametric states for battery power, clutch reactive torques, maximum and minimum torque outputs from the first and second electric machines 56 and 72, engine input torque, the specific operating range state and the operator torque request. The optimization function 440 determines transmission operation comprising an output torque, motor torques, and associated battery and electrical powers ('To(j), Ta(j), Tb(j), Pbat(j), Pa(j), Pb(j)') associated with the candidate input power and candidate input speed based upon the system inputs and the operating torque request for the candidate operating range state. The output torque, motor torques, and associated battery powers, penalty costs and power cost inputs are input to a cost function 450, which executes to determine a power cost ('Pcost(j)') for operating the powertrain at the candidate input power and candidate input speed in response to the operator torque request in the candidate operating range state. The 2-D search engine 410 iteratively generates the candidate input speeds and candidate input powers over the range of input speeds and range of input powers. The optimization function 440 determines the transmission operation for each candidate input speed and candidate input power. The cost function 450 determines the associated power costs. The 2-D search engine 410 identifies a preferred input power ('Pi*') and preferred input speed ('Ni*') and associated preferred cost ('P*cost'). The preferred input power ('Pi*') and preferred input speed ('Ni*') comprises the candidate input power and candidate input speed that result in a minimum power cost for the candidate operating range state.

Figure 9:
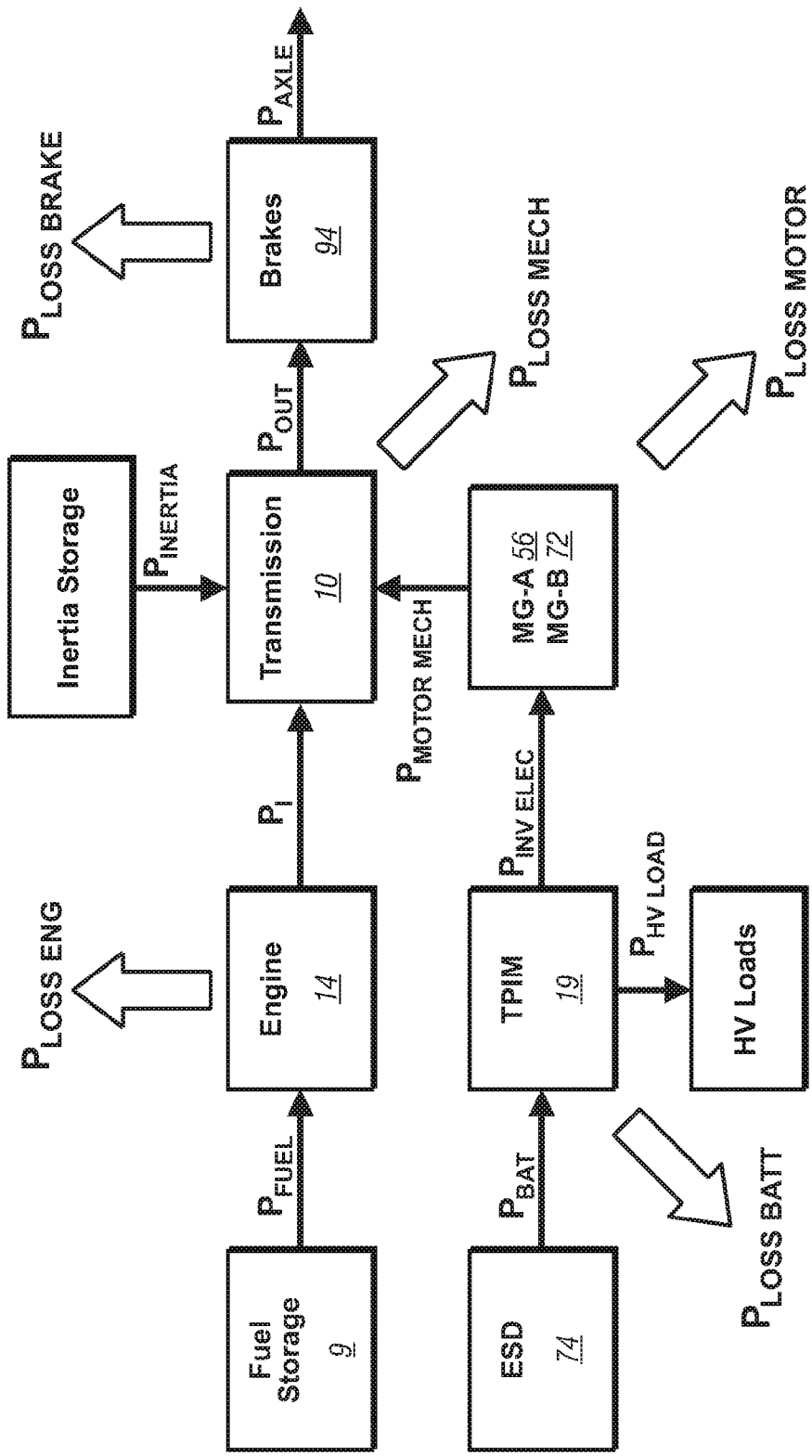
FIG. 9 is a schematic power flow diagram, in accordance with the present disclosure.

FIG. 9 schematically shows power flow and power losses through hybrid powertrain system, in context of the exemplary powertrain system described above. There is a first power flow path from a fuel storage system 9 which transfers fuel power ('$P_{FUEL}$') to the engine 14 which transfers input power ('$P_I$') to the transmission 10. The power loss in the first flow path comprises engine power losses ('$P_{LOSS\ ENG}$'). There is a second power flow path which transfers electric power ('$P_{BAT}$') from the ESD 74 to the TPIM 19 which transfers electric power ('$P_{INV\ ELEC}$') to the first and second electric machines 56 and 72 which transfer motor mechanical power ('$P_{MOTOR\ MECH}$') to the transmission 10. The power losses in the second power flow path include battery power losses ('$P_{LOSS\ BATT}$') and electric motor power losses ('$P_{LOSS\ MOTOR}$'). The TPIM 19 has an electric power load ('$P_{HV\ LOAD}$') that services electric loads in the system ('HV Loads'), which can include a low voltage battery storage system (not shown). The transmission 10 has a mechanical inertia power input ('$P_{INERTIA}$') in the system ('Inertia Storage') that preferably include inertias from the engine 14 and the transmission 10. The transmission 10 has mechanical power losses ('$P_{LOSS\ MECH}$') and power output ('$P_{OUT}$'). The brake system 94 has brake power losses ('$P_{LOSS\ BRAKE}$') and the remaining power is transferred to the driveline as axle power ('$P_{AXLE}$').

The power cost inputs to the cost function 450 are determined based upon factors related to vehicle driveability, fuel economy, emissions, and battery usage. Power costs are assigned and associated with fuel and electrical power consumption and are associated with a specific operating points of the hybrid powertrain. Lower operating costs can be associated with lower fuel consumption at high conversion efficiencies, lower battery power usage, and lower emissions for each engine speed/load operating point, and take into account the candidate operating state of the engine 14. As described hereinabove, the power costs may include the engine power losses ('$P_{LOSS\ ENG}$'), electric motor power losses ('$P_{LOSS\ MOTOR}$'), battery power losses ('$P_{LOSS\ BATT}$'), brake power losses ('$P_{LOSS\ BRAKE}$'), and mechanical power losses ('$P_{LOSS\ MECH}$') associated with operating the hybrid powertrain at a specific operating point which includes input speed, motor speeds, input torque, motor torques, a transmission operating range state and an engine state.

The mechanical power loss in the transmission 10 includes power losses due to rotational spinning, torque transfer, and friction, and operation of parasitic loads, e.g., a hydraulic pump (not shown) for the transmission 10. The mechanical power loss can be determined for each operating range state for the transmission 14 and input speed. Mechanical power loss related to the input speed ('Ni') and the output speed ('No') can be represented by Eq. 1:

$$P_{MECH\ LOSS} = aN_i + bN_i^2 + cN_iN_o + dN_o^2 \qquad [1]$$

wherein a, b, c, and d comprise calibrated scalar values determined for the specific powertrain system and each specific transmission operating range state.

Thus, in fixed gear operation, i.e., in one of the fixed gear operating ranges states of G1, G2, G3 and G4 for the embodiment described herein, the power cost input comprising the mechanical power loss to the cost function 450 can be predetermined outside of the 1-dimension search scheme 610. In mode operation, i.e., in one of the mode operating ranges states of M1 and M2 for the embodiment described herein, the power cost input comprising the mechanical power loss to the cost function 450 can be determined during each iteration of the search scheme 620.

The state stabilization and arbitration block 280 selects a preferred transmission operating range state ('Hybrid Range State Des') which preferably is the transmission operating range state associated with the minimum preferred cost for the allowed operating range states output from the operating range state analyzer 260, taking into account factors related to arbitrating effects of changing the operating range state on the operation of the transmission to effect stable powertrain operation. The preferred input speed ('Ni_Des') is the engine input speed associated with the preferred engine input comprising the preferred engine input speed ('Ni*'), the preferred engine input power ('Pi*'), and the preferred engine input torque ('Ti*') that is responsive to and preferably meets the operator torque request for the selected preferred transmission operating range state. Due to subjective constraints imposed on a system such as that herein described, the transmission operating range state selected may not in all cases be that which is truly optimal from the standpoint of energy usage and power losses.

In one embodiment, such a system may provide a search method for determining a desirable input speed for a transmission in a combination that comprises at least one torque actuator mechanically coupled to the transmission, the torque actuator contributing to the input speed of said transmission. One search method includes first selecting a potential operating point for the at least one torque actuator from a search range, in which the potential operating point has associated with it a transmission input speed value and a transmission input power value. For purposes of the disclosure, the term 'candidate' can be used interchangeably with the term 'potential' in describing operating points and transmission operating range states. A plurality of power losses associated with operation of the combination at the potential operating point is determined, each which is combined to provide a total power loss for that point. The selection of a potential operating point, determination of power losses and their combination is repeated to provide a plurality of potential operating points, each of which have a total power loss associated with them. The potential operating points are evaluated for desirability, based on at least one criteria selected from the group consisting of: objective operating criteria and subjective operating criteria, and one operating point is selected from the plurality of potential operating points. Conducting such a search method under the constraint that the output power of said transmission is kept substantially-constant provides that the contours of the power losses (costs) are more prone to be linear when defined in an $N_I$, $P_I$ plane, thus providing advantageous rapidity for a search engine that incorporates such methodology to convergence on an operating point of interest.

Figure 10:
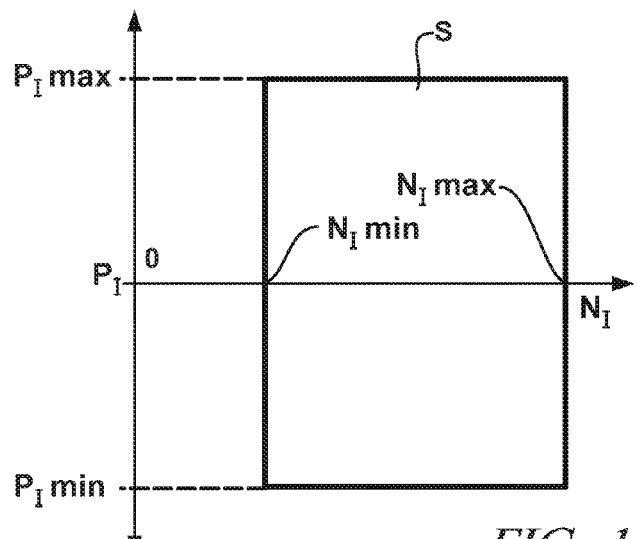
FIG. 10 illustrates one embodiment of a two-dimensional search range or space, which may be a region definable by coordinate axes with associated minimum and maximum abscissa and ordinate values, in accordance with the present disclosure.

A search engine such as 410 can be conceived of as operating on a defined two-dimensional space that contains points corresponding to candidate $N_I$ and $P_I$ values for each potential transmission operating range state, such as space S as shown in FIG. 10 as the region on the coordinate axes bounded by $P_I$ Min, $P_I$ Max, $N_I$ Min, and $N_I$ Max, wherein $P_I$ represents input power to the electro-mechanical hybrid transmission and $N_I$ is the transmission input speed. The space S, which is the search range, is defined using hardware specifications, which typically include electric machine operating speed limits, engine operating speed limits, transmission output speed, and engine torque limits. However, in general, the space S is not disposed at a static location on the $P_I$, $N_I$ coordinate axes, but rather changes its position over time in response to operating conditions, which may include changes in operator torque requests and changes in road grade. Changes in the location of the space S on the $P_I$, $N_I$ coordinate axes can occur at every iteration of an operational loop in a microprocessor carrying out the iterations and can occur at intervals as short as 1 millisecond. Thus, over a few seconds time, the space S may effectively sweep out a very large space over potential values within the $P_I$, $N_I$ coordinate axes. In accordance with one embodiment of the disclosure, a reduction the effective size of the space S is effected.

In one embodiment a search engine such as search engine 410 selects, either randomly or according to any desired algorithm, an $N_I$ and $P_I$ pair present in the space S, and a maximum transmission output torque ($T_O$ Max) and a minimum transmission output torque ($T_O$ Min) associated with the $N_I$ and $P_I$ pair chosen is calculated based on system constraints. Repetition of this method for a large number of different potential $N_I$ and $P_I$ pairs provides a plurality of different $T_O$ Min and $T_O$ Max values for each potential transmission operating range state. The method is repeated for each potential transmission operating range state and a plurality of $T_O$ Min and $T_O$ Max pairs are generated for the space S of and for each potential transmission operating range state and $N_I$ and $P_I$ pairs provided.

From such plurality of different $T_O$ Min and $T_O$ Max values so generated by a search engine for a given potential transmission operating range state, the $N_I$ and $P_I$ pair having the highest $T_O$ Max value associated with each potential transmission operating range state is generally selected as the preferred $N_I$ and $P_I$ pair when an operator torque request is greater than $T_O$ Max. In some embodiments for cases in which an operator torque request is less than $T_O$ Min, the potential $N_I$ and $P_I$ pair associated with the lowest $T_O$ Min value is generally selected as the preferred $N_I$ and $P_I$ for the particular potential transmission operating range state under consideration. In any event, it is in generally desirable to be able to quickly locate, within a space S for each potential transmission operating range state, that $N_I$ and $P_I$ pair that has the least power losses associated with it. The effectiveness of such a task is inhibited by the fact that the location of the space S is moving essentially constantly, which over time makes the effective size of the search range of the space S very large.

Towards reduction of the effective size of the space S, pre-calculations are undertaken in a computer simulation which in one embodiment is not operatively connected to a drivetrain as described herein. Such pre-calculations, or off-line simulations, are carried out using values for engine coolant temperature, engine torque curves, battery power limits, electric machine speed limits, electric machine torque limits, transmission oil temperature, and battery state-of-charge which are frequently encountered by a motorized vehicle during its operation, to determine maximum and minimum values for $N_I$ and $P_I$ which can be used to define a space S that is smaller in range than the space S that is encountered during use of a search engine and system useful therewith as herein described. Without use of a method as described herein, the search range embraced by the space S was based on $N_I$ min and $N_I$ max values that were based on speed-based system constraints and $P_I$ min and $P_I$ max values that were based on $T_I$ min and $T_I$ max values provided by the ECM 23; however a method as provided herein narrows down the search range embraced by the space S, based on off-line simulation results.

Figure 11:
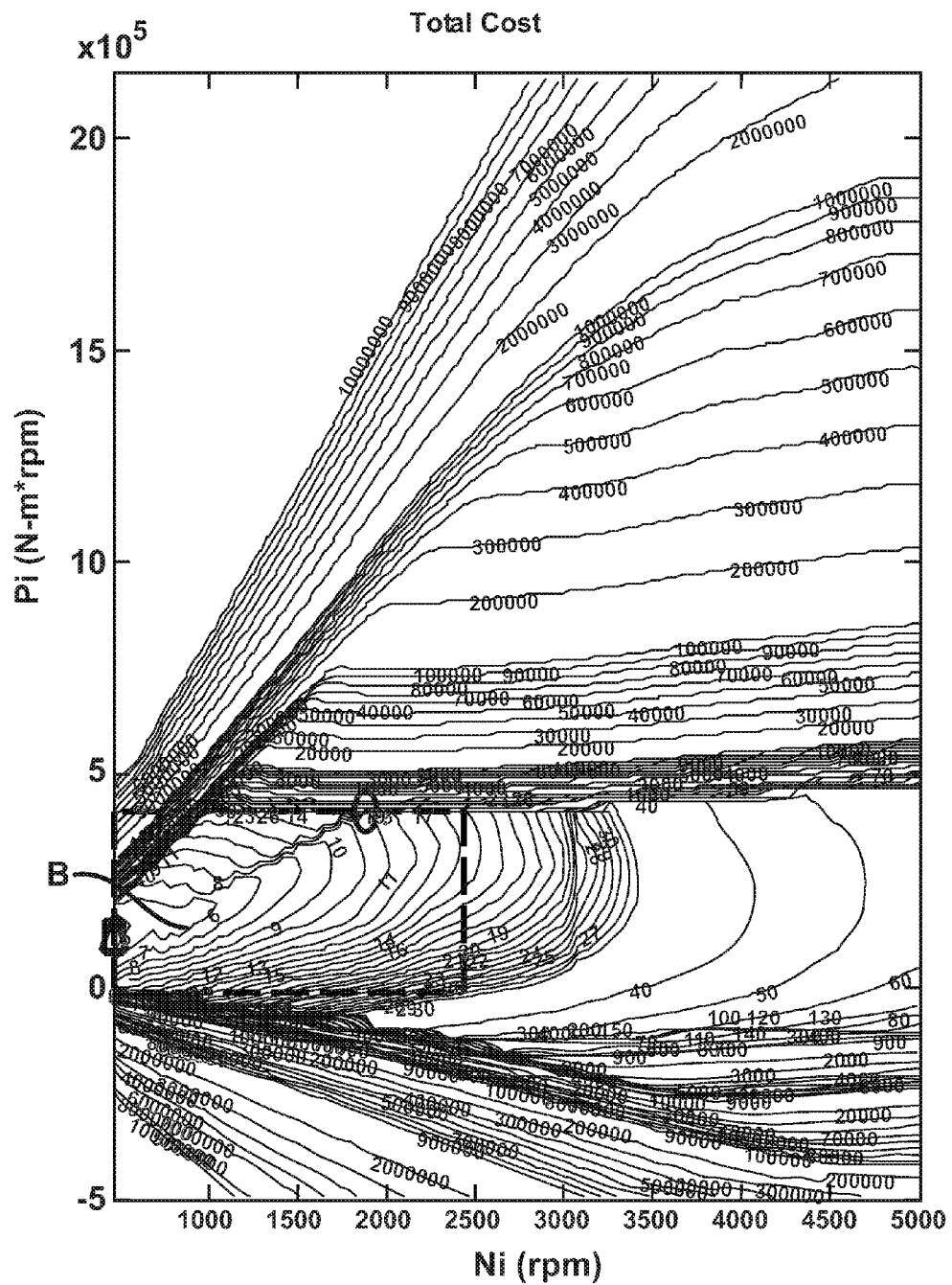
FIG. 11 shows a contour plot of energy losses associated with operating points for a transmission as described herein, in accordance with the present disclosure.

In one embodiment of the disclosure the $N_I$, $P_I$ plane representing search range embraced by the space S is determined by first choosing one point in that plane and evaluating it for power losses. Other points are chosen, either arbitrarily or according to any desire algorithm and similarly evaluated for power loss if the system were operating at those points. By evaluating, via an off-line computer simulation, a large number of points (which may be on the order of 100,000 points), a contour plot such as that shown in FIG. 11 is obtained. The contour lines present in the plot of FIG. 11 represent points having equal power losses, or costs associated with operating at those points. The process of generating a plot such as that shown in FIG. 11 is repeated for points having different combinations of transmission output speeds and transmission output torques to provide one such plot as shown in FIG. 11 for each $N_O$, $T_O$ point. By such a method, an off-line "library" of plots is generated, the number of which plots is determined by the desires of the programmer, for example, in one embodiment, a library containing about 2500 of such plots is generated.

Thus, according to the foregoing, the search range was determined by an off-line simulation that evaluates each point in the Ni, Pi plane within the "large" search range space S set by system constraints. FIG. 11 shows the total power loss (Cost) at an operating point (No, To) in the Ni, Pi domain. The steep contour changes represent the violation of system constraints, e.g., To, Ta, Tb, Ti, and $P_{Batt}$. The suggested search range space S excludes operating points that violate system constraints and points associated with large costs that are (subjectively) determined as non desirable. For To points that are beyond the deliverable To limits, a torque margin is included in the window search determination, so that the window does not shrink to a single point in the search plane.

From FIG. 11 one can get an idea of locations within the plot where the energy losses (costs, as expressed in units of power therein) are relatively small, which is the area labeled B within the highlighted box in FIG. 11. The space labeled B in FIG. 11 may be determined using an algorithm, one example of which is shown below:

---

If To > To Max Max − To Margin
   Find Ni, Pi Range where (To Max < To MaxMax −To Margin) & (Ta penalty Cost < a) & ( Tb Penalty Cost < b) & (Ti penalty Cost < c) & (PBatt Penalty cost ≤d)

-continued

```
ElseIf To > To MinMin + To Margin
    Find Ni, Pi Range where (To Min < To MinMin +To Margin) & (Ta
    penalty Cost < a) & ( Tb Penalty Cost < b) & (Ti penalty Cost < c) &
    (PBatt Penalty cost ≤d)
Else
    Find Ni, Pi Range where (To Min ≤ To ≤ To Max) & (Ta penalty Cost
    < a) & ( Tb Penalty Cost < b) & (Ti penalty Cost < c) & (PBatt
    Penalty cost ≤d) & (Objective Power Loss Cost < e)
End
``` in which a, b, c, and d are cost criteria that can reduce the search range to exclude operating points that reside outside of the system constraints. Setting these values to 0 will exclude all points not within the constraints. Setting the values to a small, non-zero positive value has the effect of providing a margin around each of the system constraints to minimize the effect of simulation errors that could otherwise erroneously exclude points that are within the constraints. The Ta/Tb/Ti/PBatt penalty costs refer to the costs that are imposed to the $N_I$, $P_I$ pair that is associated with Ta, Tb, Ti, PBatt points that are not within their achievable limits. In general, these penalty costs are provided to increase proportionally with the amount of how much each point exceeds each achievable limit. The cost criteria "e" can further reduce the search range to exclude points that are within the system constraints but have high objective power loss costs subjectively determined as being non-optimal. In the first If step, a ToMax(ToMin) is calculated for each Ni, Pi point that is evaluated by including the Output Torque limiting inside the search loop. ToMax-Max (ToMinMin) is the maximum(minimum) of all ToMax (ToMin), which represents the maximum(minimum) output torque that can be produced within the evaluated Ni, Pi range. In the Else step, the Objective Power Loss cost is the sum of battery power loss, machine power loss, engine power loss, and transmission power loss.

A process as set forth above with respect to determining the area B on FIG. 11 may be repeated, for each plot that exists in the library that was generated during the off-line simulation, to arrive at an area for each plot that is analogous to area B of FIG. 11. In the hypothetical case, such as the one mentioned above in which a library containing 2500 of such plots is generated, an area analogous to area B of FIG. 11 is generated for each of the 2500 plots. However, the area B of FIG. 11 can be represented by the four points which define the rectangle of area B therein, and in a method according to one embodiment of the disclosure in which a library containing 2500 of the aforementioned plots were generated, one outcome is a set of four points for each of the 2500 plots generated.

Figure 12:
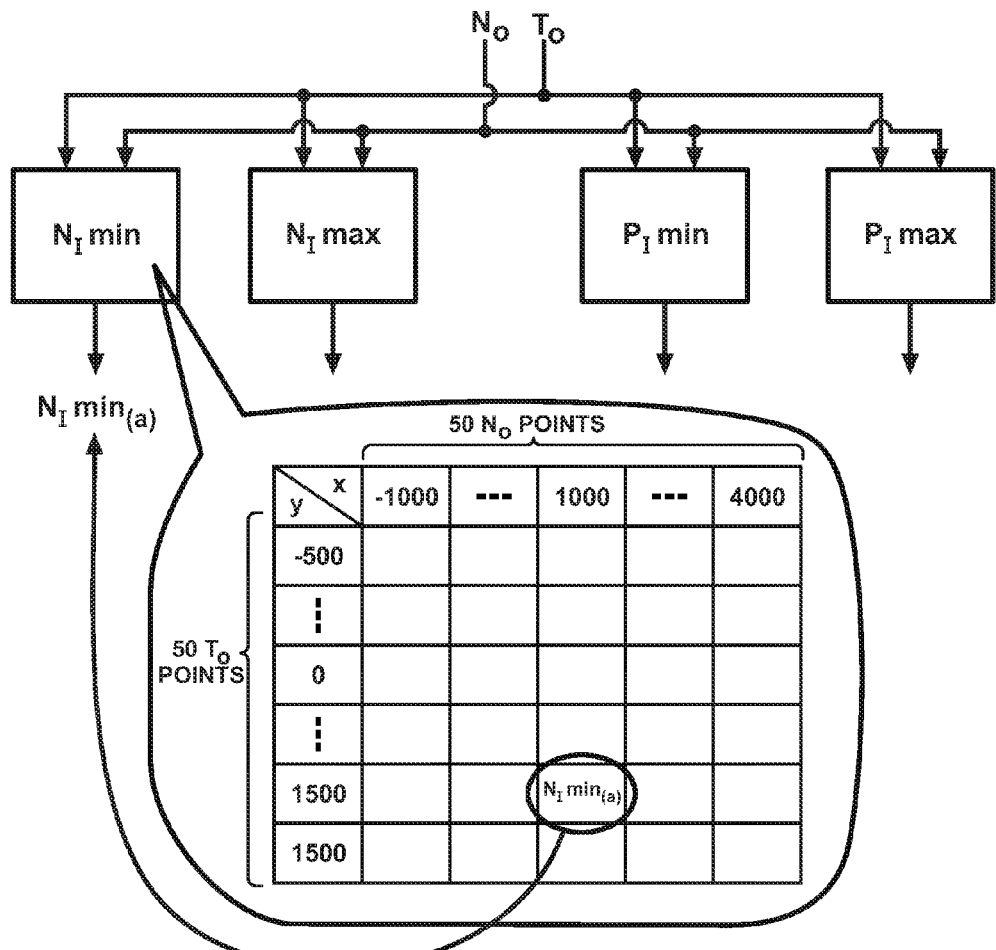
FIG. 12 shows one arrangement of data from a plurality of contour plots, in accordance with the present disclosure.

An alternate representation of the four points for each of the 2500 plots so generated per the foregoing, is to provide four tables of data, each of which four tables of data comprise 2500 entries, and each of which four tables contain values of $N_I$min, $N_I$max, $P_I$min, and $P_I$max, as shown in FIG. 12. Such a table containing $N_I$min values is amplified in the bubble of FIG. 12 and is seen to comprise fifty columns of $N_O$ values and fifty rows of $T_O$ values. It is well known in the art to convert power values to torque values when the rpm is known. The tables for the $N_I$max, $P_I$min, and $P_I$max are similarly structured. Thus, when a vehicle operator makes a power request having $N_O$ and $T_O$ values associated with it such as is shown at the top of FIG. 12, determination of the $N_I$min value associated with such a power request is readily found by reference to the $N_I$min table. For example, if the operator power request comprises an $N_O$ value of 1000 rpm and a $T_O$ value of 1500 Newton*Meters, a microprocessor refers to the table for the $N_I$min values and simply finds the box having the location 1000, 1500 and extracts the value for $N_I$min(a). In like fashion, values for $N_I$max, $P_I$min, and $P_I$max for the operator torque request having an $N_O$ value of 1000 rpm and a $T_O$ value of 1500 Newton*Meters are readily extracted from the other three tables. As one of ordinary skill in the art readily recognizes, the number of plots generated being 2500 in this one example was chosen for illustrative purposes, and any desired number of plots may be generated. The values of the parameters $N_O$ and $T_O$ in the example of FIG. 12 are discrete numbers, and for determining numerical values of $N_O$ and $T_O$ which reside between the values of the rows and columns, simple mathematical interpolation is employed.

Thus, a method for determining a set of values for $N_I$min, $N_I$max, $P_I$min, and $P_I$max for input to a 2-D search engine such as 410 has been provided, and these values of $N_I$min, $N_I$max, $P_I$min, and $P_I$max are sufficient to define search range space S having a substantially smaller size than what is otherwise provided by a system as described herein. This decreased size of the space S provided by a method according to this disclosure translates to decreased demand on computer resources and accordingly results in more efficient searching and faster pinpointing of exact operating points for potential transmission operating modes.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for decreasing the size of a space from within which a two-dimensional search engine selects points defined by numerical pairs for evaluation in a powertrain system, said space comprising at least one two-dimensional first region, said first region having minimum and maximum abscissa and ordinate values associated with it, wherein a control module performs the following steps comprising:

generating a plurality of contour plots, said contour plots having abscissa and ordinate axes, and comprising contours which are representative of a property associated with points within the first region bounded by said abscissa and ordinate axes;

selecting a second region from each of said contour plots, said second regions each comprising minimum and maximum engine input speed abscissa values and minimum and maximum engine input power ordinate values;

providing a two-dimensional input request within each of the selected second regions, the two-dimensional input request comprising a power input request having values of output speed and output torque;

providing four tables of data, comprising
 a first table only containing values of said minimum engine input speed abscissa values,
 a second table only containing values of said maximum engine input speed abscissa values,
 a third table only containing values of said minimum engine input power ordinate values,
 a fourth table only containing values of said maximum engine input power ordinate values;

providing extracted values from said four tables based on said two-dimensional input request using the control module comprising
 extracting a value for said minimum engine input speed abscissa value from said first table based on said two-dimensional input request, extracting a value for said maximum engine input speed abscissa value from said second table based on said two-dimensional input request, extracting a value for said minimum engine input power ordinate value from said third table based on said two-dimensional input request, extracting a value for said maximum engine input power ordinate value from said fourth table based on said two-dimensional input request;

determining a search space having a smaller area than the second region for input to the two-dimensional search engine that excludes engine input speed and engine input power values that violate powertrain system constraints of transmission output torque, at least one electric machine torque, engine input torque and battery power, the determined search space defined by said extracted values for said minimum engine input speed abscissa value, said maximum engine input speed abscissa value, said minimum engine input power ordinate value, and said maximum engine input power ordinate value;

for each of a plurality of engine input speed and engine input power pairs within said determined search space having the smaller area than the second region, selecting a respective maximum transmission output torque and a respective minimum transmission output torque; and one of selecting the engine input speed and engine input power pair associated with the maximum transmission output torque having a highest magnitude when an output torque request is greater than said maximum transmission output torque, and selecting the engine input speed and engine input power pair associated with the minimum transmission output torque having a lowest magnitude when said output torque request is less than said minimum transmission output torque.

2. A method as in claim 1 further comprising:
searching said search space to determine a desirable point, based on any pre-selected criteria.

3. A method as in claim 2 wherein said searching is conducted using an algorithm.

4. A method as in claim 1 wherein said property is power loss associated with a drivetrain for points located within said first region, said first region having coordinates of transmission input speed and transmission input power.

5. A method as in claim 1 wherein said numerical pairs selected for evaluation are each associated with a value obtained by summing at least two power losses associated with a driveline of a motorized vehicle when operating in a continuously-variable mode at points represented by said numerical pairs within said space.

6. A method as in claim 1 wherein said second region comprises less area on a two-dimensional plane than said first region.

7. A method as in claim 1 wherein said first region undergoes a change of position within said two-dimensional plane as a function of time.

* * * * *